(12) United States Patent
Seifert et al.

(10) Patent No.: US 11,326,661 B2
(45) Date of Patent: *May 10, 2022

(54) DAMPER

(71) Applicant: TEXTRON INNOVATIONS INC., Providence, RI (US)

(72) Inventors: Michael Scott Seifert, Southlake, TX (US); Peter Quinn Romano, Buffalo, NY (US); Thomas Parham, Colleyville, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/293,040

(22) Filed: Mar. 5, 2019

(65) Prior Publication Data

US 2019/0203795 A1 Jul. 4, 2019

Related U.S. Application Data

(63) Continuation-in-part of application No. 15/359,305, filed on Nov. 22, 2016, now Pat. No. 10,232,936.

(51) Int. Cl.
  *F16F 7/116* (2006.01)
  *B64C 27/00* (2006.01)
  (Continued)

(52) U.S. Cl.
  CPC ............ *F16F 7/116* (2013.01); *B64C 27/001* (2013.01); *F16F 7/108* (2013.01); *F16F 15/06* (2013.01); *B64C 29/0033* (2013.01)

(58) Field of Classification Search
  CPC .. F16F 7/104; F16F 7/108; F16F 7/116; F16F 15/06; B64C 27/001
  (Continued)

(56) References Cited

U.S. PATENT DOCUMENTS 3,005,520 A    10/1961   Mard et al.
3,204,911 A *   9/1965   Lawrence ................. F16F 7/14
                                                                         248/611
(Continued)

FOREIGN PATENT DOCUMENTS

CN    201982561 U *   9/2011
DE    3914668 A1 * 11/1990 ........... H01S 3/0323
(Continued)

OTHER PUBLICATIONS

European Patent Office, European Search Report for EP Appl. No. 17190775.1 dated Apr. 19, 2018, 5 pp.
(Continued)

*Primary Examiner* — Thomas J Williams
(74) *Attorney, Agent, or Firm* — Edwin S. Flores; Daniel J. Chalker; Chalker Flores, LLP

(57) ABSTRACT

The present invention includes a damper assembly, method and kit to provide dampening to an airframe comprising: a mass to dampen the vibration of the airframe; one or more wire rope isolators having a first and a second portion, wherein the mass is attached to the one or more wire rope isolators and the mass is isolated from the airframe by the one or more wire rope isolators; and a first fastener and a second fastener, wherein the first fasteners attaches to the first portion of the wire rope isolator to the mass, and the second fastener attaches the second portion of the wire rope isolator to the airframe to dampen vibration of the airframe.

29 Claims, 15 Drawing Sheets

(51) Int. Cl.
*F16F 15/06* (2006.01)
*F16F 7/108* (2006.01)
*B64C 29/00* (2006.01)

(58) Field of Classification Search
USPC .......................................... 188/378, 379, 380
See application file for complete search history.

(56) References Cited

U.S. PATENT DOCUMENTS

| | | | |
|---|---|---|---|
| 4,042,070 A | 8/1977 | Flannelly | |
| 5,374,012 A | 12/1994 | Marchand et al. | |
| 5,499,790 A | 3/1996 | Hay | |
| 5,549,285 A | 8/1996 | Collins | |
| 6,009,985 A | 1/2000 | Ivers | |
| 6,244,579 B1 | 6/2001 | Latvis, Jr. | |
| 6,290,217 B1 | 9/2001 | Schneider et al. | |
| 6,406,011 B1 | 6/2002 | Kosar et al. | |
| 6,719,503 B1* | 4/2004 | McCalmont | B23Q 11/0035 188/378 |
| 7,104,372 B2* | 9/2006 | Dussac | F16F 7/01 188/380 |
| 7,234,153 B2 | 6/2007 | Jensen | |
| 7,303,185 B2 | 12/2007 | Sebert | |
| 7,510,147 B2 | 3/2009 | Haber | |
| 8,622,375 B2 | 1/2014 | Bosworth et al. | |
| 8,657,250 B2* | 2/2014 | Venghaus | H01Q 1/005 248/499 |
| 8,714,324 B2 | 5/2014 | Shimoda et al. | |
| 10,232,936 B2* | 3/2019 | Seifert | B64C 27/001 |
| 10,280,791 B2* | 5/2019 | Peters | F16F 7/023 |
| 10,655,699 B2* | 5/2020 | Keinanen | F16F 7/14 |
| 2004/0124052 A1 | 7/2004 | Larmande | |
| 2007/0144707 A1 | 5/2007 | Tu et al. | |
| 2008/0173754 A1 | 7/2008 | Strehlow et al. | |
| 2008/0237949 A1* | 10/2008 | Hasegawa | F16F 7/108 267/140 |
| 2011/0017561 A1 | 1/2011 | Tanaka | |
| 2012/0168271 A1* | 7/2012 | Ryaboy | G01M 5/0066 188/379 |
| 2012/0256048 A1 | 10/2012 | Wang et al. | |
| 2013/0068918 A1 | 3/2013 | Mulder | |
| 2015/0369326 A1 | 12/2015 | Modrezejewski et al. | |
| 2016/0377140 A1* | 12/2016 | Frota De Souza Filho | B29C 45/14508 188/380 |

FOREIGN PATENT DOCUMENTS

| | | | |
|---|---|---|---|
| EP | 3324071 A1 | 5/2018 | |
| JP | 2002514723 A * | 5/2002 | F16F 7/104 |
| JP | 201246998 A | 12/2012 | |
| WO | 2014195575 A1 | 12/2014 | |

OTHER PUBLICATIONS

European Patent Office, Examination Report for EP Appl. No. 17190775.1 dated May 14, 2018, 7 pp.
European Patent Office, Examination Report for EP Appl. No. 17190775.1 dated Dec. 29, 2018, 5 pp.
Rafik, et al. "Parametric experimental study of wire rope spring tuned mass dampers" Journal of Wind Engineering and Industrial Aerodynamics—91, (2003) 1363-1385 7 pp.
European Patent Office, Communication pursuant to Article 94(3) EPC/Examination Report for EP Appl. No. 17190775.1 dated Jul. 30, 2019, 6 pp.
European Pa 1 Ent Office, Communication pursuant to Article 94(3) EPC/Examination Report for EP Appl. No. 19180627 2 dated Jul. 1, 2020,4 pp.

* cited by examiner

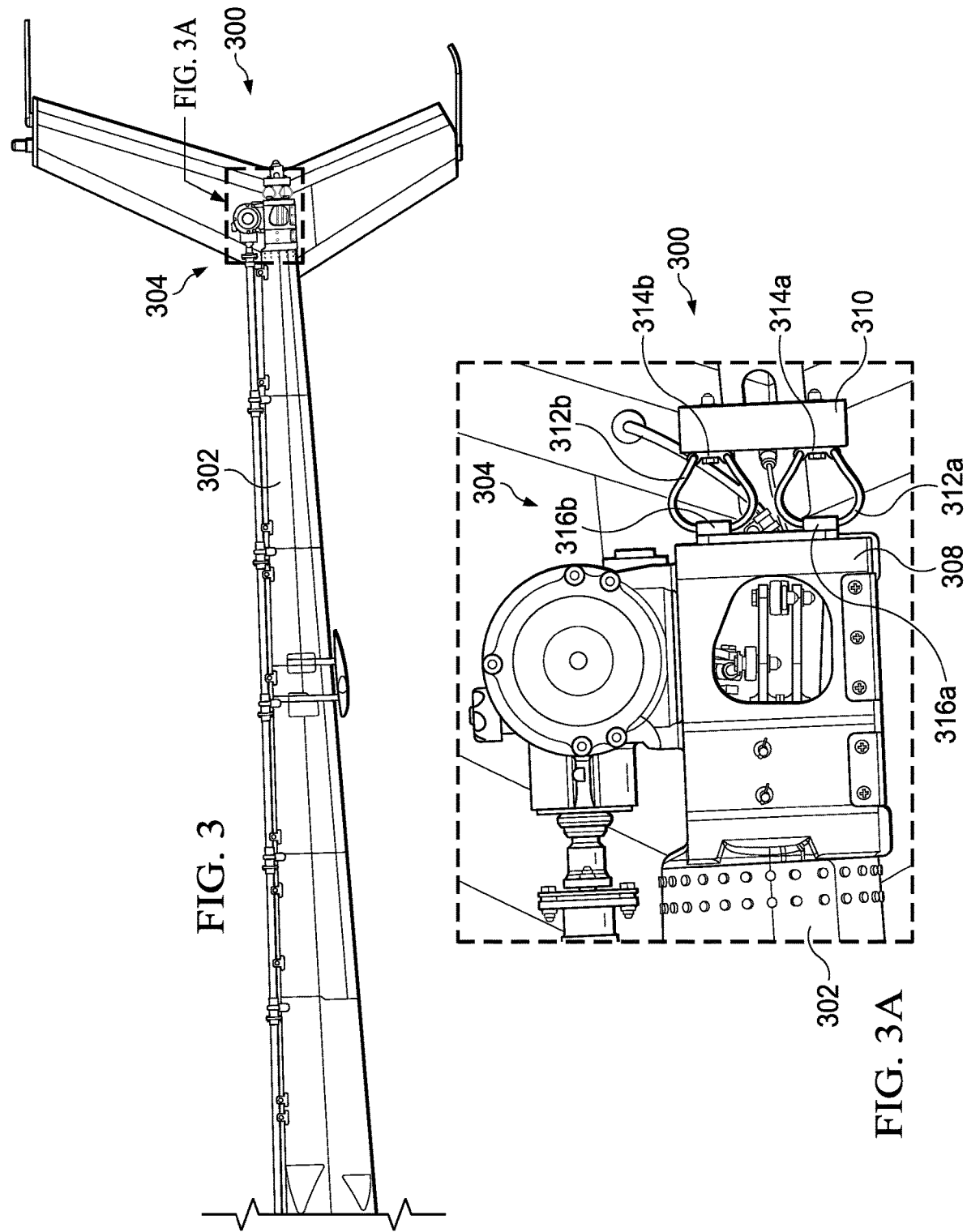

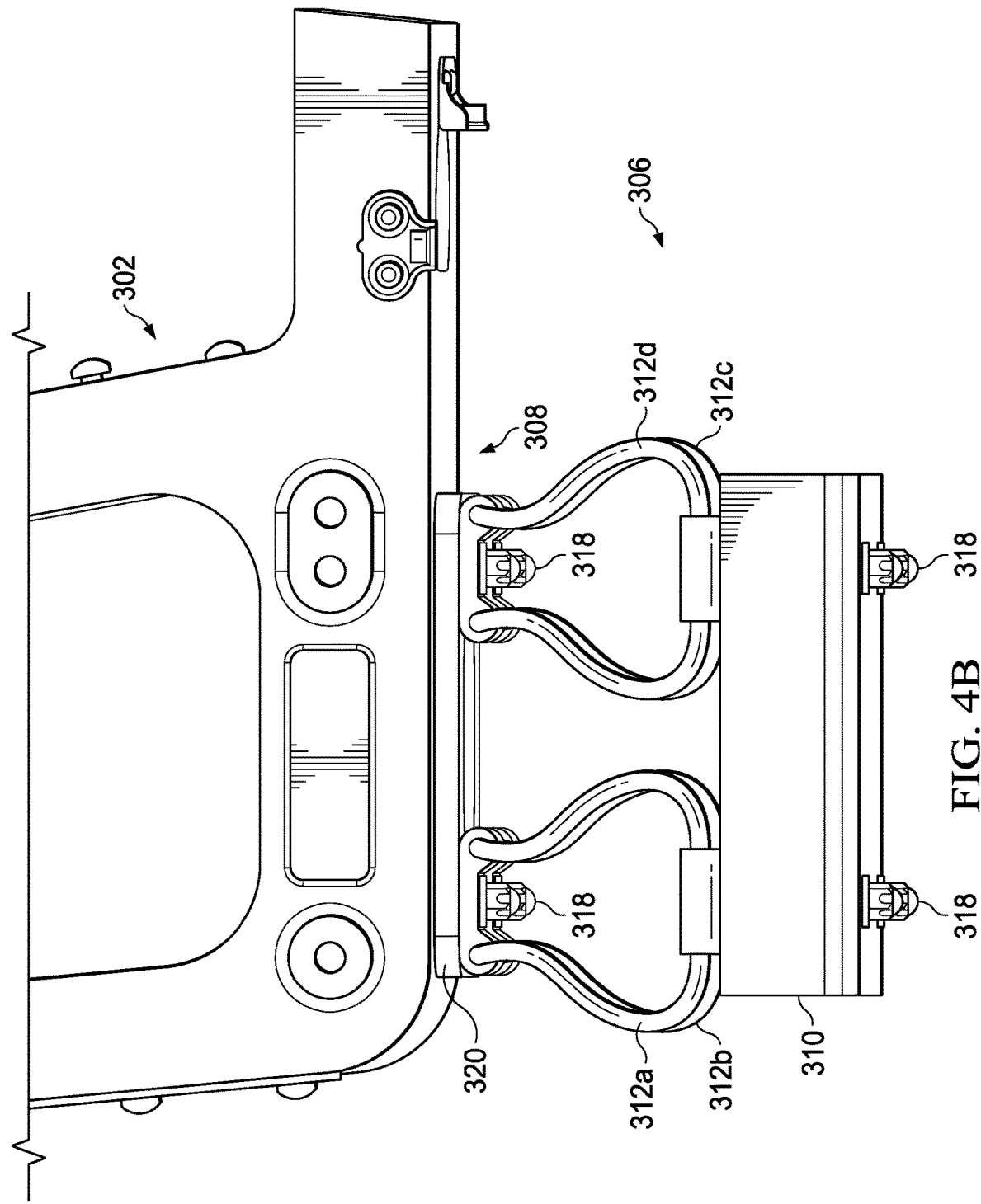

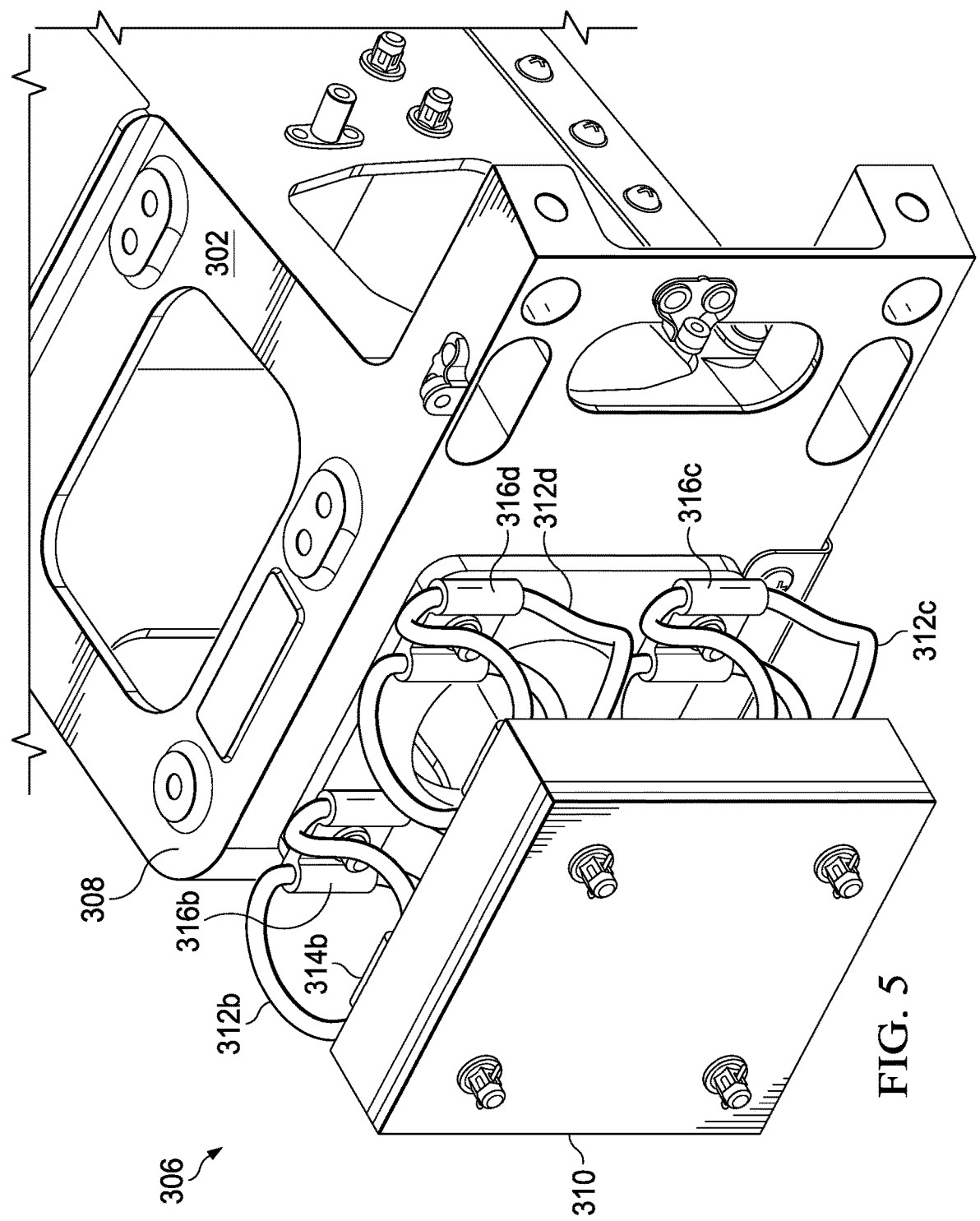

DAMPER

CROSS-REFERENCE TO RELATED APPLICATIONS

This application is a continuation-in-part of U.S. patent application Ser. No. 15/359,305 filed on Nov. 22, 2016, now U.S. Pat. No. 10,232,936. The entire contents of which are hereby incorporated by reference for all purposes.

STATEMENT OF FEDERALLY FUNDED RESEARCH

Not applicable.

TECHNICAL FIELD OF THE INVENTION

The present invention relates in general to the field of dampers, and more particularly, to a novel damper assembly.

BACKGROUND OF THE INVENTION

Without limiting the scope of the invention, its background is described in connection with aircraft dampers.

One such patent is U.S. Pat. No. 8,622,375, issued to Bosworth, et al. and entitled, "Dual frequency damper for an aircraft". Briefly, these inventors teach a dual frequency damper includes a liquid inertia vibration eliminator (LIVE) portion and a fluid damper portion. The LIVE portion and fluid damper portion are said to operate in series and function so that dual frequency damper is optimized in both stiffness and damping at multiple frequencies. LIVE portion acts as a frequency dependent switch to selectively cause low frequency oscillatory forces to be treated primarily by the high spring rate and high damping rate characteristics of the fluid damper portion, and also to select high frequency oscillatory forces to be primarily treated by the low spring rate and low damping rate characteristics of the LIVE unit portion.

One such patent application is U.S. Patent Publication No. 2015/0369326, filed by Modrezejewski, et al., and entitled "Rotating Shaft Damping With Electro-Rheological Fluid". Briefly, these applicants teach rotating shaft damping using an electro-rheological fluid. At least a portion of a circumferential surface area of a portion of a rotorcraft rotating shaft is surrounded with multiple hollow members, and each hollow member includes an electro-rheological fluid having a viscosity that changes based on an electric field applied to the electro-rheological fluid. The vibration of the rotorcraft rotating shaft is controlled by changing the viscosity of the electro-rheological fluid in response to the electric field applied to the electro-rheological fluid.

Yet another application is U.S. Patent Publication No. 2008/0173754, filed by Strehlow, et al., and is entitled "Method For Damping Rear Extension Arm Vibrations Of Rotorcraft And Rotorcraft With A Rear Extension Arm Vibration Damping Device". Briefly, these applicants are said to teach a method for damping vibrations in a tail boom of a rotary-wing aircraft includes the steps of detecting tail boom vibrations induced by external vibration excitation, and generating and introducing strains into the tail boom based on the detected tail boom vibrations. Next, strains are applied over a surface area and are out-of-phase with respect to the detected tail boom vibrations so as to damp the externally excited induced tail boom vibrations. In addition, a rotary-wing aircraft, includes a fuselage, a cockpit area integrated into the fuselage, a tail boom arranged on the fuselage and a tail boom vibration-damping device. The vibration-damping device includes at least one sensor element configured to detect tail boom vibrations induced by external vibration excitation and at least one actuator configured to generate and introduce strains into the tail boom that are out-of-phase with respect to the induced tail boom vibrations, the actuator being functionally coupled to the sensor element, engaging with a tail boom structure at one side of the tail boom, and forming a flat-surfaced bond with the tail boom.

SUMMARY OF THE INVENTION

In one embodiment, the present invention includes a damper assembly for an airframe comprising: a mass to damp the vibration of the airframe; one or more wire rope isolators having a first and a second portion, wherein the mass is attached to the one or more wire rope isolators and the mass is isolated from the airframe by the one or more wire rope isolators; and a first fastener and a second fastener, wherein the first fasteners attaches to the first portion of the wire rope isolator to the mass, and the second fastener attaches the second portion of the wire rope isolator to the airframe to dampen vibration of the airframe. In one aspect, the wire rope isolators are further defined as comprising a stiffness, compression/shear, compression/roll, and shape, wherein the stiffness, compression/shear, compression/roll, and shape of the wire rope is selected to provide frequency isolation of the mass in two or more frequencies. In another aspect, the first fastener or the second fastener is selected to attach the damper assembly to a rotorcraft or vertical take off and landing craft. In another aspect, the first and second portions of the one or more wire rope isolators are along a side of the one or more wire rope isolators, at the ends of the one or more wire rope isolators, at the end and/or along the side of the one or more wire rope isolators. In another aspect, the mass is connected by 2, 3, 4, 5, 6, 7, 8, 9, 10, 11, 12, or more wire rope isolators that are positioned on one or more sides of the mass. In another aspect, the mass is positioned within an airframe, as the end of the airframe, at the end of a tail boom, along the length of a tail boom, or a combination thereof. In another aspect, the damper assembly is a passive damper assembly. In another aspect, the damper assembly further comprises a coating on the mass, the first or second fasteners, and/or the one or more wire rope isolators. In another aspect, the mass, the first or second fasteners, or the one or more wire rope isolators are selected from at least one of metal, composite, polymer, ceramic, alloys, or combinations of the same. In another aspect, the wire rope isolators are defined further as comprising one or more of fiber strands, fiber wires, polymer strands, polymer wires, lubricating oil, polymer, adhesive, filler, and/or a coating. In another aspect, the wire rope is selected from a size, shape, and strength of the wire rope in one or more dimensions based on at least one of: (1) a rope bending length l; (2) a diameter D of sheave and/or drum; (3) one or more simple bendings per working cycle w-sim; (4) one or more reverse bendings per working cycle w-rev; (5) a combined fluctuating tension and bending per working cycle w-com; (6) a relative fluctuating tensile force deltaS/S; or (7) a rope tensile force S. In another aspect, the vibration is adjusted in two or more frequencies based on the shape, size, compressive strength, rotational strength, or pull strength of the wire rope.

In another embodiment, the present invention includes a method for damping vibration of an airframe comprising: providing a mass to dampen the vibration of the airframe;

selecting one or more wire rope isolators having a first and a second portion, wherein the mass is isolated from the airframe by the one or more wire rope isolators; and attaching the mass to the one or more wire rope isolators and the one or more wire rope isolators to an airframe, wherein one or more first fasteners attach the first portion of the one or more wire rope isolators to the mass, and one or more second fasteners attach the second portion of the one or more wire rope isolators to the airframe, wherein the mass dampens vibration of the airframe. In one aspect, the wire rope isolators are further defined as comprising a stiffness, compression/shear, compression/roll, and shape, wherein the stiffness, compression/shear, compression/roll, and shape of the wire rope is selected to provide frequency isolation of the mass in two or more frequencies. In another aspect, the first fastener or the second fastener is selected to attach the damper assembly to a rotorcraft or vertical take off and landing craft. In another aspect, the first and second portions of the one or more wire rope isolators are along a side of the one or more wire rope isolators, at the ends of the one or more wire rope isolators, at the end and/or along the side of the one or more wire rope isolators. In another aspect, the mass is connected by 2, 3, 4, 5, 6, 7, 8, 9, 10, 11, 12, or more wire rope isolators that are positioned on one or more sides of the mass. In another aspect, the mass is positioned within an airframe, as the end of the airframe, at the end of a tail boom, along the length of a tail boom, or a combination thereof. In another aspect, the damper assembly is a passive damper assembly. In another aspect, the method further comprises coating one or more of the mass, the first or second fasteners, or the one or more wire rope isolators. In another aspect, the mass, the first or second fasteners, or the one or more wire rope isolators are selected from at least one of metal, composite, polymer, ceramic, alloys, or combinations of the same. In another aspect, the wire rope isolators are defined further as comprising one or more of fiber strands, fiber wires, polymer strands, polymer wires, lubricating oil, polymer, adhesive, filler, and/or a coating. In another aspect, the wire rope is selected from a size, shape, and strength of the wire rope in one or more dimensions based on at least one of: (1) a rope bending length l; (2) a diameter D of sheave and/or drum; (3) one or more simple bendings per working cycle w-sim; (4) one or more reverse bendings per working cycle w-rev; (5) a combined fluctuating tension and bending per working cycle w-com; (6) a relative fluctuating tensile force deltaS/S; or (7) a rope tensile force S. In another aspect, the vibration is adjusted in two or more frequencies based on the shape, size, compressive strength, rotational strength, or pull strength of the wire rope.

In another embodiment, the present invention includes a mass damper kit for an airframe comprising: a mass selected to dampen the vibration of the airframe; one or more wire rope isolators having a first and a second portion, wherein the one or more wire rope isolators are selected to dampen airframe vibration; and one or more first fasteners and one or more second fasteners, wherein the one or more first fasteners are adapted to attach the first portion of the wire rope isolator to the mass, and the one or more second fasteners are adapted to attach the second portion of the wire rope isolator to the airframe to dampen vibration of the airframe; and instructions to attach the mass to the one or more wire rope isolators via the one or more first fasteners and one or more wire rope isolators via the second fasteners to the airframe.

BRIEF DESCRIPTION OF THE DRAWINGS

For a more complete understanding of the features and advantages of the present invention, reference is now made to the detailed description of the invention along with the accompanying figures and in which:

FIG. 3 shows a tail boom of a rotorcraft and FIG. 3A is a close-up view of the tail section of the tail boom showing one configuration of the damper of the present invention;

FIG. 4B shows a top view of the end of the tail boom and one configuration of the damper positioned at the end of the tail boom;

FIG. 5 shows an isometric view of the end of the tail boom and one configuration of the damper positioned at the end of the tail boom;

DETAILED DESCRIPTION OF THE INVENTION

Figure 1:
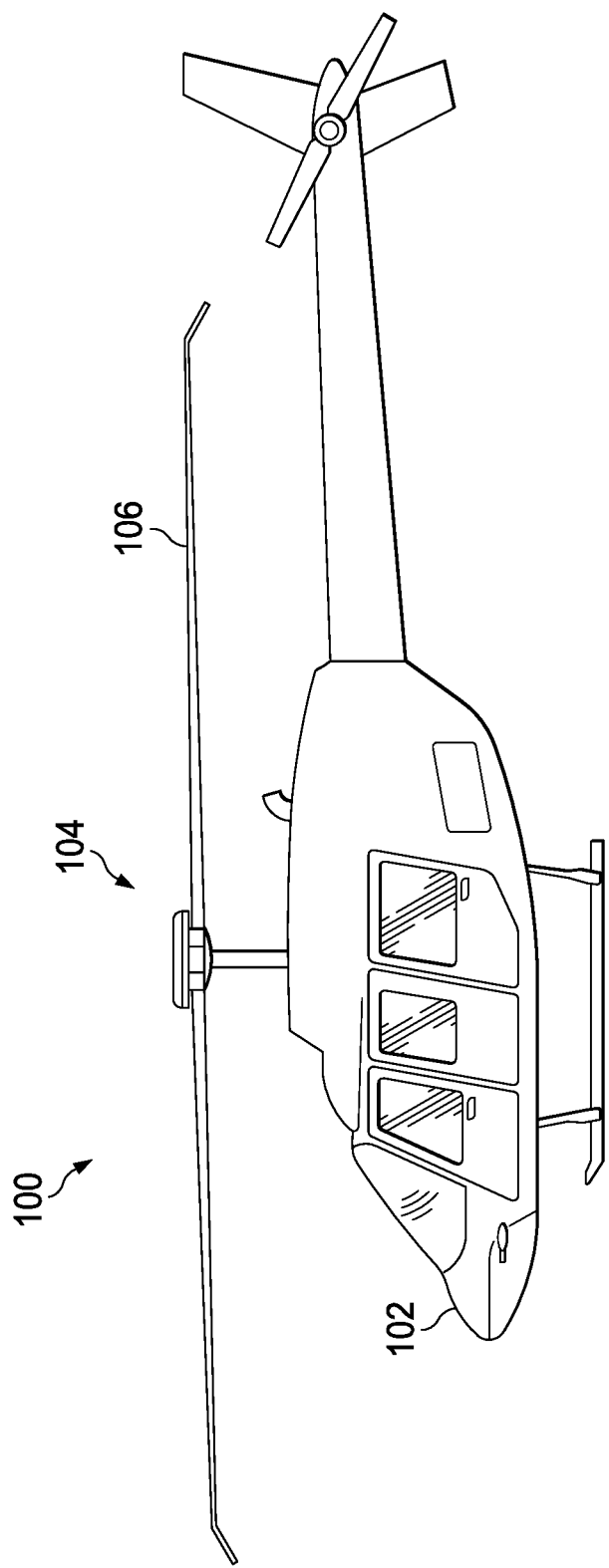
FIG. 1 shows a side view of a helicopter according to a preferred embodiment of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is a passive vibration dampening device that is attached with wire ropes to the frame of a craft, such as an aircraft. Non-limiting examples of aircrafts include rotorcraft, such as helicopters and vertical take off and landing aircraft. Briefly, the moving mass is excited by a given source, typically the vibrational forcing from rotor blades, which in turn provides damping for a critical mode placed very near a known excitation frequency. This reduces the vibration levels at that frequency felt throughout the aircraft.

As used herein, the term "wire rope" refers to one or more ropes with strands of metal or steel wire laid or twisted into a shape around a core. The cross-sectional shape of the wires can be, for example, round, ovoid, trapezoidal, square, rectangular, triangular, or combinations thereof. The wire rope may also include a "core", which can be one of three types: (1) a fiber core, made up of synthetic or natural material (fiber cores are generally the most flexible and elastic, but are easily crushed and thus not suitable for heavy loads); (2) a wire strand core, is made up of one additional strand of wire, and is typically used for suspension; and (3) an independent wire rope core, which is the most durable in all types of environments, or combinations thereof. The one or more wires of the wire rope are typically made of non-alloy carbon steel although other suitable materials may be used such as steel, iron, stainless steel, chromium steel, galvanized steel, alloys, monel, and bronze materials. Wires may be made by suitable methods, such as the drawing process where the wire cross-section is reduced in stages, for example in multiple stages, e.g., from 0.1 mm to 10 mm diameter. Using a drawing process, the nominal strength of the wire may be increased.

As used herein, the term, "shear stiffness" refers to the stiffness of a wire rope isolator or equivalent in a sheer direction. For example, the direction of shear can be along a longitudinal axis of a cylindrical wire rope isolator, or in a lateral direction if the wire rope isolator does not have a longitudinal axis. As such, the shear stiffness can also be related to a shape of the wire rope isolator that can be selected to provide frequency isolation of the mass in two or more frequencies. Shear stiffness is distinguishable from stiffness with regard to compression, in which case the wire rope isolator is compressed or distended with regard to its overall diameter or width.

The type and material of the wire rope can be selected to select different compression, tensile strength, flexure, or any parameter in three dimensions, including using different types of wire rope within a single wire rope assembly. Non-limiting examples of wire rope include those that are: (1) stranded ropes (aka running ropes) that are formed by bending over sheaves and cylinders and are stressed mainly by bending and secondly by tension; (2) stationary ropes or stay ropes (spiral ropes, e.g., full-locked), which carry tensile forces and are therefore mainly loaded by static and fluctuating tensile stresses; (3) track ropes (aka full locked ropes) generally do not take on the curvature of any rollers and under the roller force, a so-called free bending radius of the rope occurs, which radius increases (and the bending stresses decrease) with the tensile force and decreases with the roller force; and/or (4) wire rope slings (aka stranded ropes), which are slings that are stressed by tensile forces but first of all by bending stresses when bent over more or less sharp edges. In particular, one or more of the following factors can be varied to optimize the dampening effect caused by the wire rope, including: (1) working cycles up to rope discarding or breakage (mean or 10% limit); (2) number of wire breaks (detection to need rope replacement); (3) rope safety factor (minimum breaking force Fmin/nominal rope tensile force S), which is the ability to resist extreme impact forces; (4) Donandt force (yielding tensile force for a given bending diameter ratio D/d), generally, the nominal rope tensile force S is smaller than the Donandt force SD1; and (5) rope diameter (maximum rope endurance for a given sheave diameter D and tensile rope force S).

FIG. 1 depicts an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with rotor system 104 for creating flight. The system of the present invention can be used in conjunction with an aircraft 100. Although shown associated with a helicopter, it will be appreciated that the system of the present application could also be utilized with different types of rotary aircraft and vehicles.

Figure 2A:
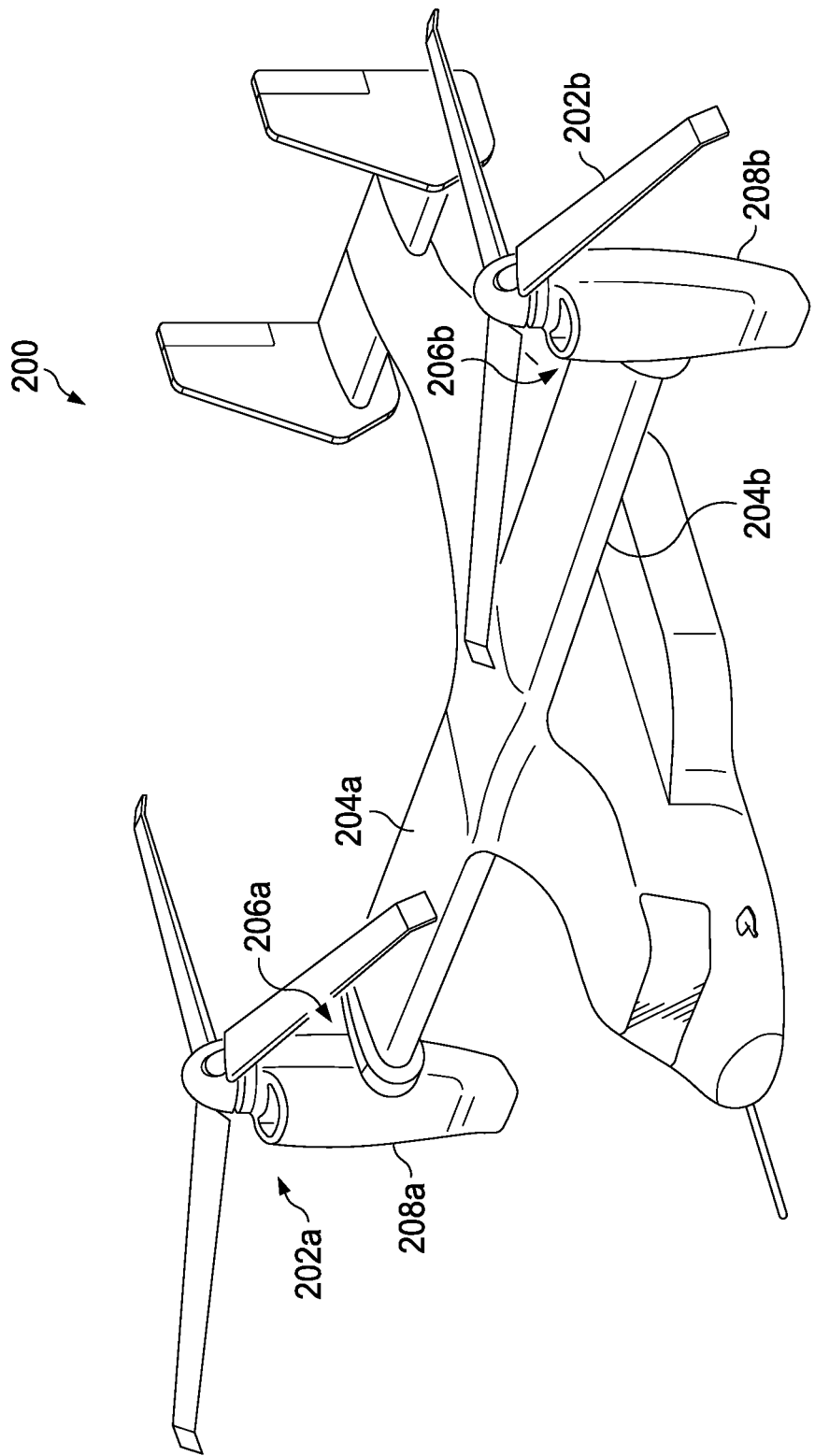
FIGS. 2A and 2B show a perspective view of tiltrotor aircraft according to an alternative embodiment of the present application.

For example, FIG. 2A illustrates a tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which carry the engines and transmissions of tiltrotor aircraft 200. Tilt rotor assemblies 202a and 202b move or rotate relative to wing members 204a and 204b between a helicopter or hover mode in which tilt rotor assemblies 202a and 202b are tilted upward, such that tiltrotor aircraft 200 flies like a conventional helicopter; and an airplane or cruise mode in which tilt rotor assemblies 202a and 202b are tilted forward, such that tiltrotor aircraft 200 flies like a conventional propeller driven aircraft.

Figure 2B:
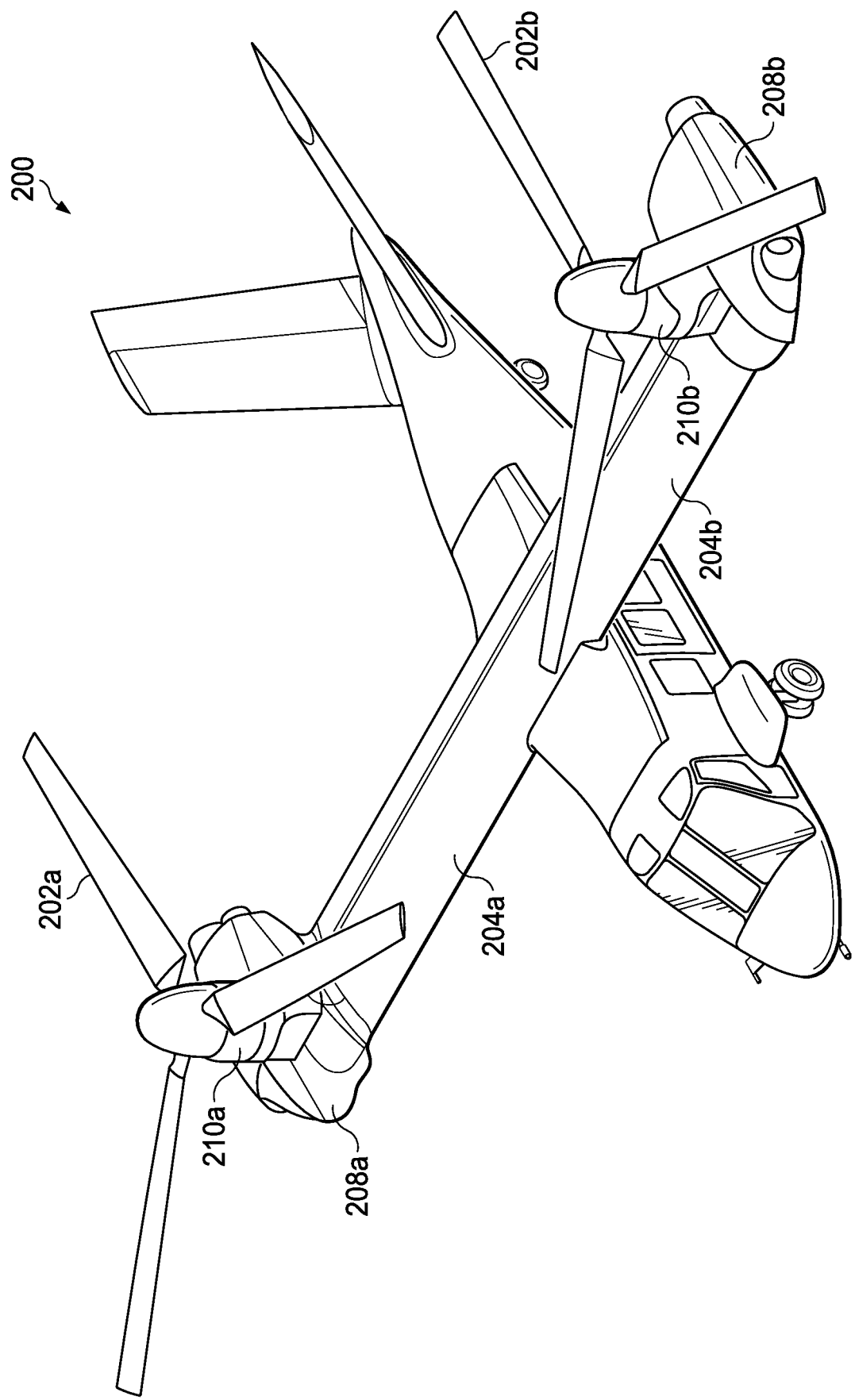

FIG. 2B illustrates another tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which include the engines and transmissions of tiltrotor aircraft 200. In this embodiment, the engines are fixed to the wing and do not rotate, rather, only the pylons 210a and 210b with the rotor assemblies 202a and 202b rotates. Tilt rotor assemblies 202a and 202b move and rotate relative to wing members 204a and 204b and the nacelles 208a and 208b. The tilt rotor assemblies 202a and 202b do not move relative to the wing members 204a and 204b. Instead, during the transition between a helicopter or hover mode only the pylons 210a and 210b with the rotor assemblies 202a and 202b rotate to redirect the thrust from the rotor assemblies 202a and 202b. The rotorcraft 200 is still able to fly like a conventional helicopter; and an airplane or cruise mode in which on the rotors are tilted forward, such that tiltrotor aircraft 200 flies like a conventional propeller driven aircraft.

FIG. 3 shows a damper system 300 on a tail boom 302 of a rotorcraft and a close-up view of a tail section 304 at the end of the tail boom 302 showing one configuration of the wire rope damper assembly 306 of the present invention. In FIG. 3A, the close-up view, the damper assembly 306 is attached to the distal end 308 of the tail boom 302, and includes a mass 310, wire ropes 312a, 312b, first fasteners 314a, 314b, and second fasteners 316a, 316b. The mass 310 is attached to the wire ropes 312a, 312b via first fasteners 314a, 314b, and the wire ropes 312a, 312b are connected to the distal end 308 of the tail boom 302 via second fasteners 316a, 316b. Thus, the wire ropes 312a, 312b isolate the mass 310 from the distal end 308 of the tail boom 302.

Figure 4A:
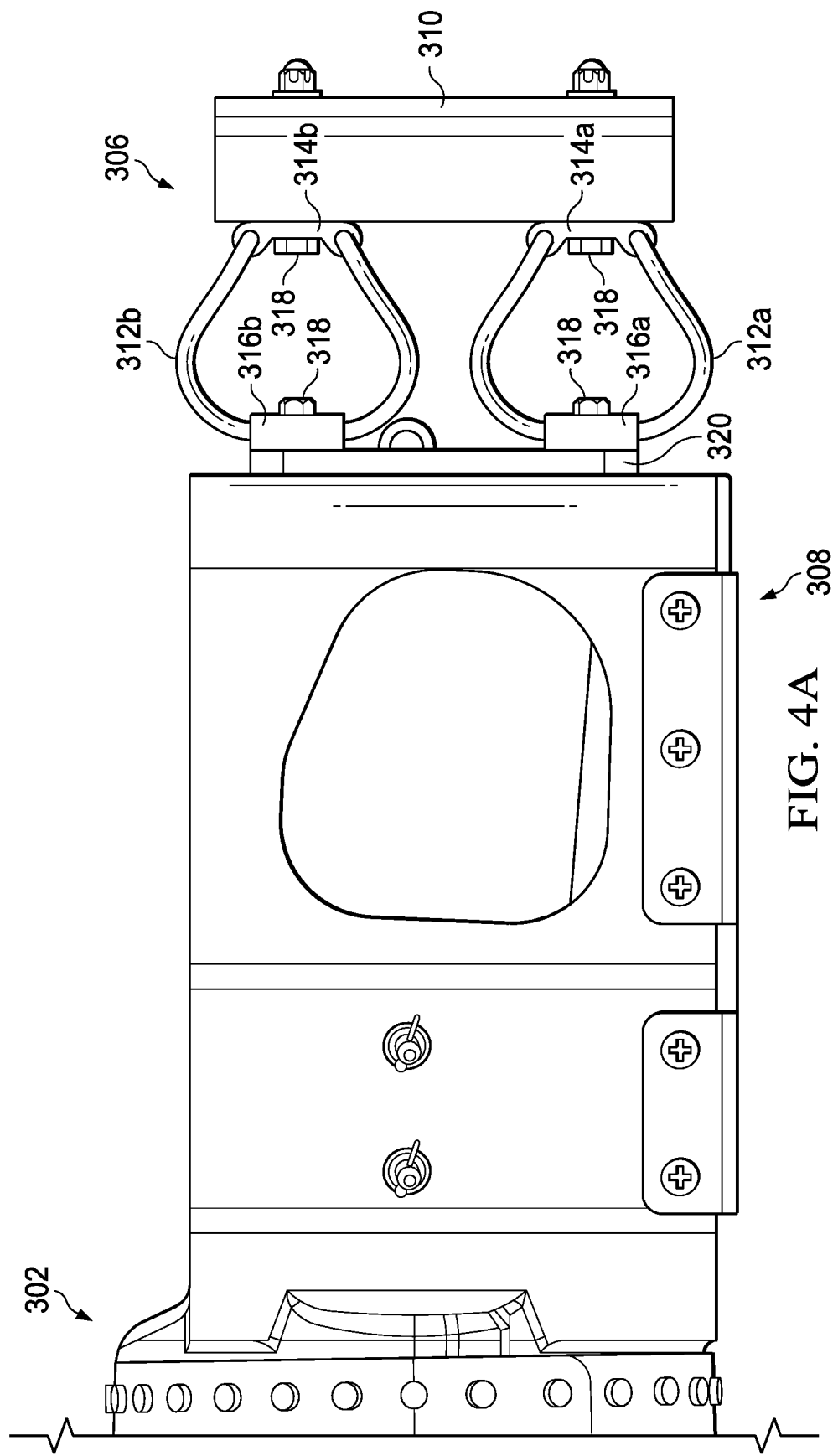
FIG. 4A shows a side view of the end of the tail boom and one configuration of the damper positioned at the end of the tail boom.

FIG. 4A shows a side view of the distal end 308 of the tail boom 302 and one configuration of the wire rope damper assembly 306 attached to the tail rotor gearbox support structure. In this side view, the damper assembly 306 is attached to the distal end 308 of the tail boom 302, and includes a mass 310, wire ropes 312a, 312b, first fasteners 314a, 314b, and second fasteners 316a, 316b. The mass 310 is attached to the wire ropes 312a, 312b via first fasteners 314a, 314b, and the wire ropes 312a, 312b are connected to the distal end 308 of the tail boom 302 via second fasteners 316a, 316b, all of which are attached by bolts 318. Thus, the wire ropes 312a, 312b isolate the mass 310 from the distal end 308 of the tail boom 302, and further include a plate 320, which can provide additional surface to attach the damper assembly 306 to the distal end 308, which distal end 308 is often open to reduce the mass of the airframe.

FIG. 4B shows a top view of the distal end 308 of the tail boom 302 and one configuration of the wire rope damper assembly 306. In this top view, the damper assembly 306 is attached to the distal end 308 of the tail boom 302, and includes a mass 310, wire ropes 312a, 312b, 312c, 312d, first fasteners 314a, 314b, 314c, and 314d, and second fasteners 316a, 316b. The mass 310 is attached to the wire ropes 312a, 312b, 312c, 312d via first fasteners and the wire ropes 312a, 312b, 312c, 312d are connected to the distal end 308 of the tail boom 302 via second fasteners. Thus, the wire ropes 312a, 312b, 312c, 312d isolate the mass 310 from the distal end 308 of the tail boom 302.

Figure 4C:
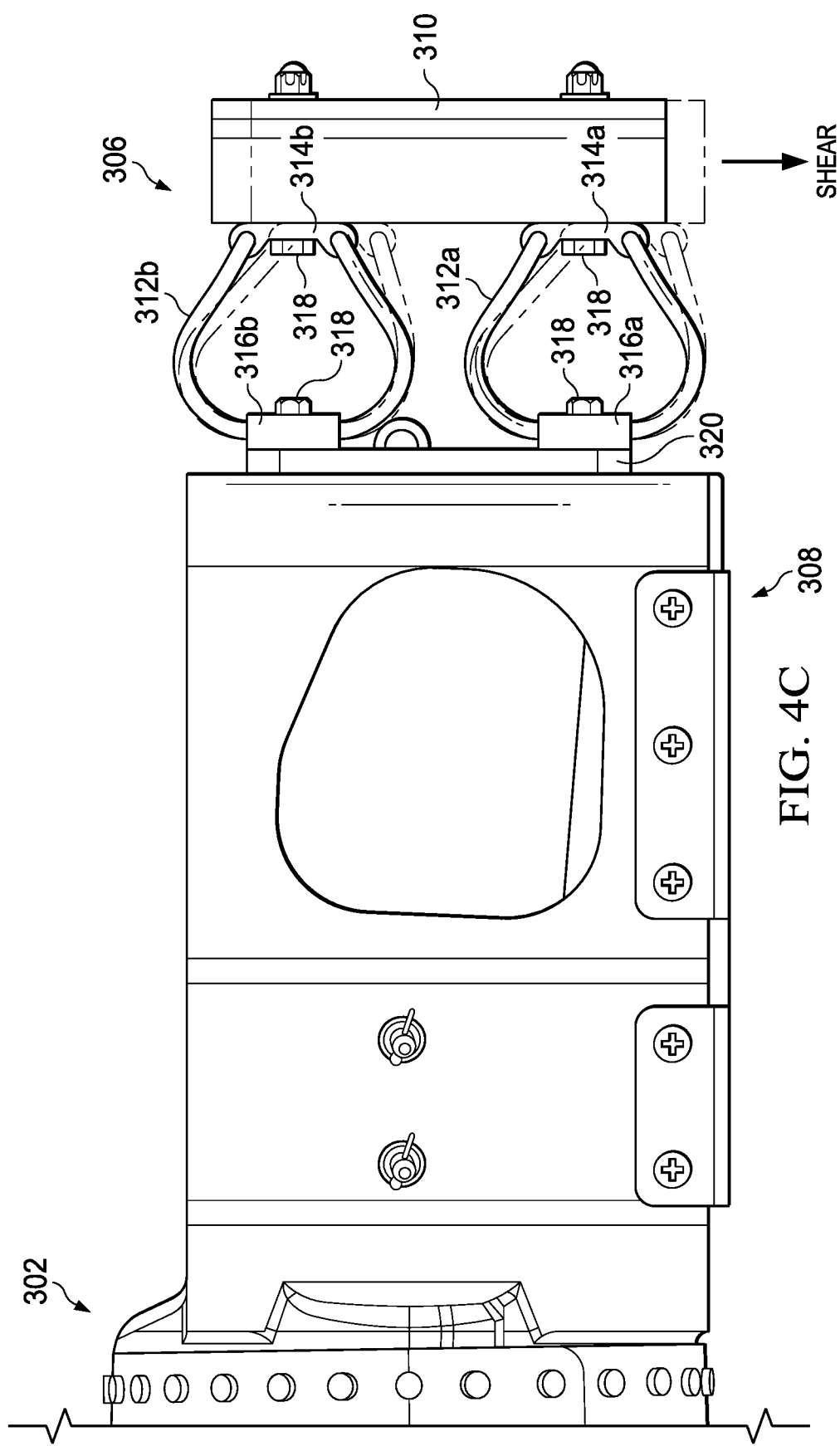
FIG. 4C shows a side view of the end of the tail boom and one configuration of the damper positioned at the end of the tail boom showing the direction for dampening for shear.

In FIGS. 4A to 4C, show the damper assembly 306 is located at the aft-most end of the tail boom, which attached to the tail rotor gearbox support airframe structure, however, the exact position for different rotorcraft can be selected for convenience and/or effectiveness. While there is no specific requirement on location, the damper assembly can work at multiple locations throughout the aircraft, with one factor being that the attaching structure must be stiff enough (of additional stiffening added) to support the damper assembly of the present invention. In FIG. 4C, the damper assembly 306 is located at the aft-most end of the tail boom 302, which attached to the tail rotor gearbox support 308 airframe structure and the figure shows the sheer direction of the damper assembly 306 in relation to the mass 310, wire ropes 312a, 312b, 312c, 312d, first fasteners 314a, 314b, 314c, and 314d, and second fasteners 316a, 316b.

FIG. 5 shows an isometric view of the distal end 308 of the tail boom 302 and one configuration of the wire rope damper assembly 306. In this top view, the damper assembly 306 is attached to the distal end 308 of the tail boom 302, and includes a mass 310, wire ropes 312b, 312c, 312d, first fasteners 314b, and second fasteners 316a, 316b. The mass 310 is attached to the wire ropes 312b, 312c, 312d via first fasteners 314b and the wire ropes 312b, 312c, 312d are connected to the distal end 308 of the tail boom 302 via second fasteners 316b, 316c, and 316d. Thus, the wire ropes 312b, 312c, 312d isolate the mass 310 from the distal end 308 of the tail boom 302.

Figure 6A:
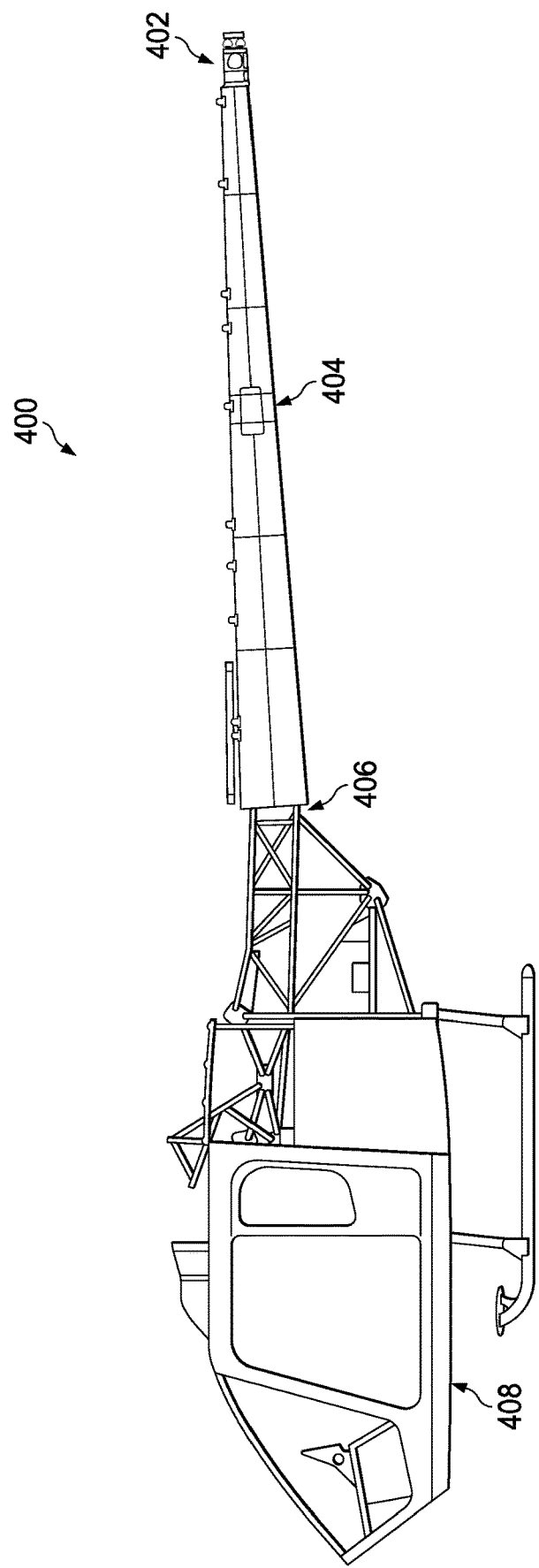
FIG. 6A shows a side view of a helicopter that shows potential location for the damper of the present invention.
Figure 6B:
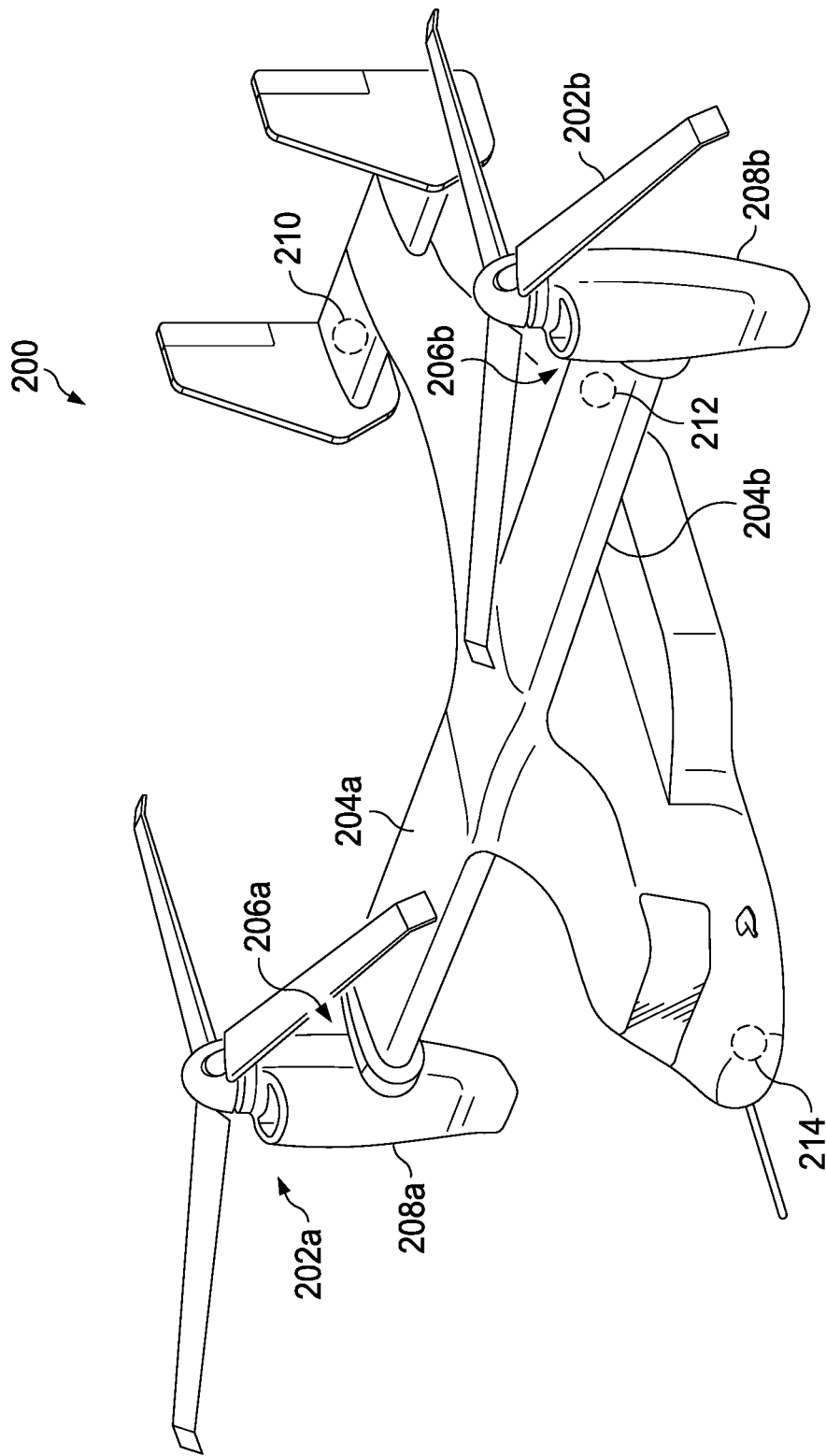
FIG. 6B shows an isometric view of a tiltrotor aircraft 200 that shows possible locations for the dampener system in accordance with the present application.
Figure 6C:
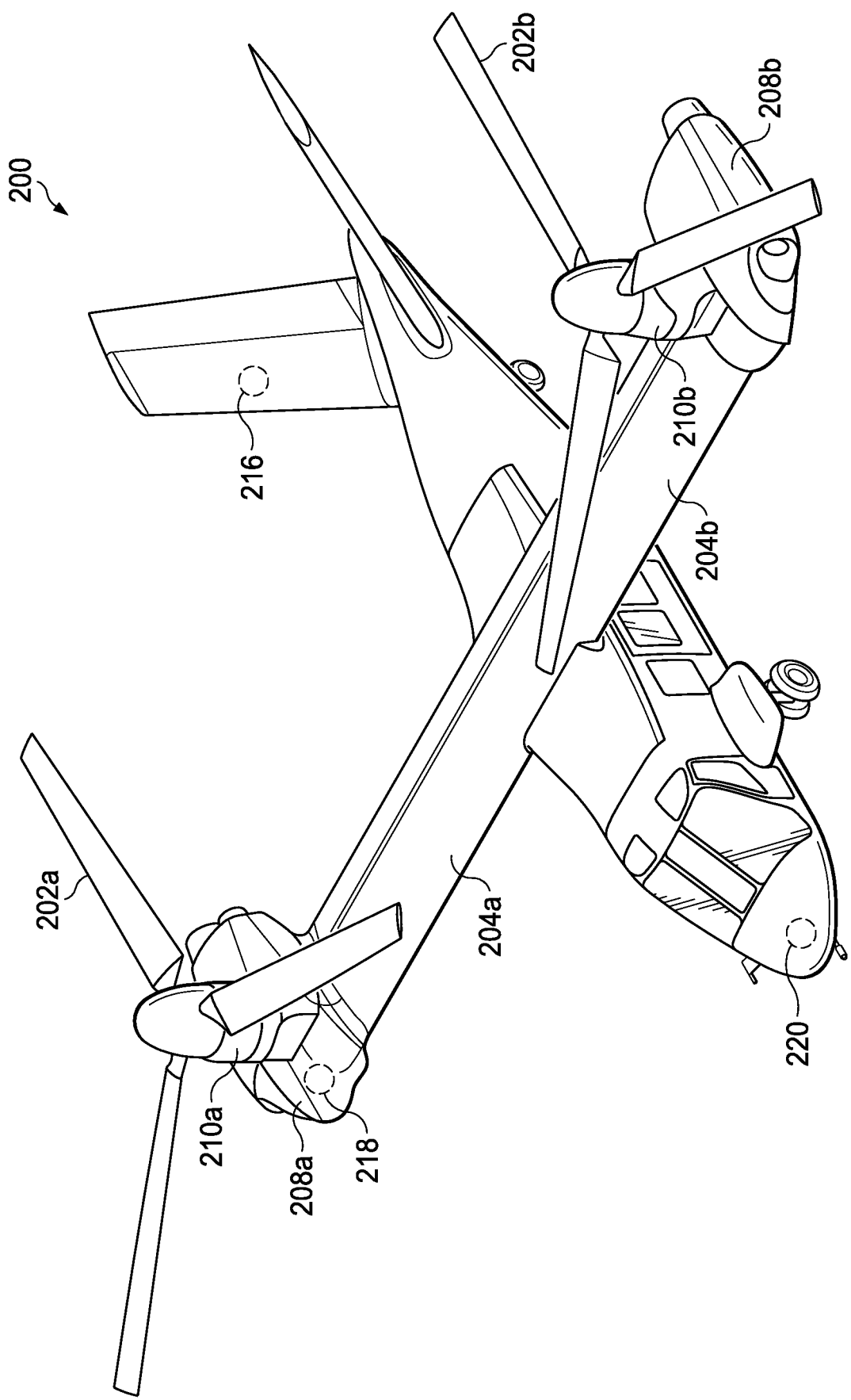
FIG. 6C shows an isometric view of a tiltrotor aircraft 200 that shows possible locations for the dampener system in accordance with the present application.

FIG. 6A shows a side view of a helicopter airframe 400 that shows potential location for one or more damper assemblies 402, 404, 406, or 408 of the present invention. FIG. 6B shows an isometric view of a tiltrotor aircraft 200 that shows possible locations for the damper, for example, in the tail structure 210, the wing structure 212, and/or the forward fuselage structure 214 for the dampener system in accordance with the present application. FIG. 6C shows an isometric view of a tiltrotor aircraft 200 that shows additional locations for the damper, for example, the tail structure 216, the wing/nacelle structure 218, of the forward fuselage structure 220 for the dampener system in accordance with the present application.

Figure 7A:
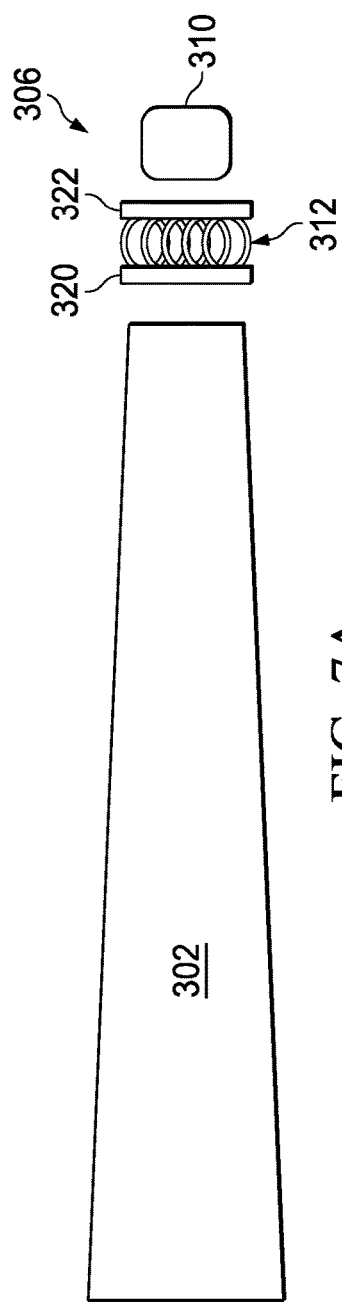
FIG. 7A shows a diagram of a side view of one configuration of the damper of the present invention.

FIG. 7A shows a diagram of an exploded side view of one configuration of the damper assembly 306 of the present invention, which is attached to the tail boom 302. In this configuration, one portion of the wire rope 312 is connected via plate 320 to the tail boom 302, and the portion of the wire rope 312 is connected via plate 322 to the mass 310. In this configuration, the wire rope isolator is providing isolation based on shear.

Figure 7B:
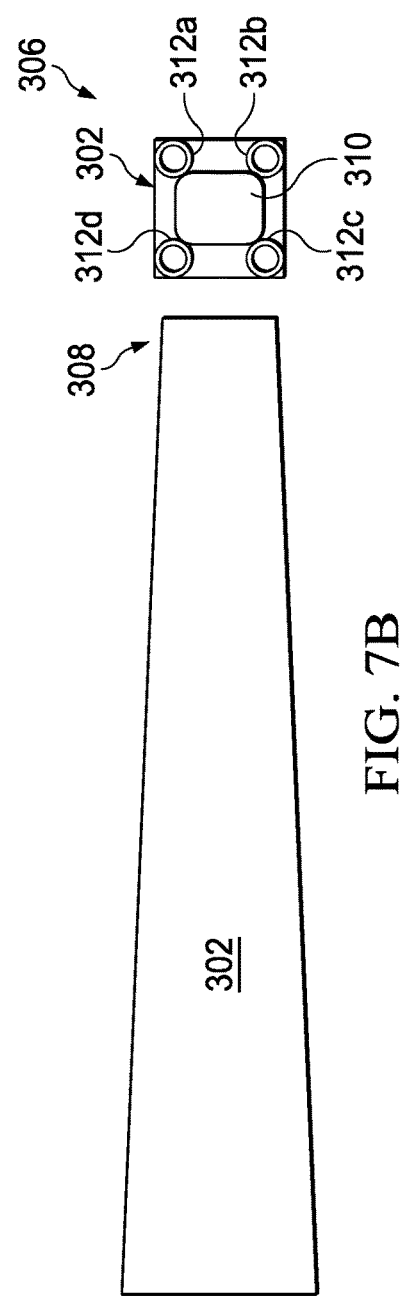
FIG. 7B shows a diagram of a side view of one configuration of the damper of the present invention.

FIG. 7B shows a diagram of a side view of another configuration of the damper assembly 306 of the present invention, which is attached to the tail boom 302. In this configuration, the tail boom 302 is shown in a side view, while the damper assembly 306 is shown as an end-view of the tail boom 302. The mass 310 is depicted as inside the tail boom 302, with the wire ropes 312a, 312b, 312c, and 312d support the mass 310 within the tail boom 302. Alternatively, the same configuration of the damper assembly 306 could be fitted within a frame positioned, and connected to, the distal end 308 of the tail boom 302. For example, in this configuration, the wire rope isolators dampen based on, e.g., 45 degree compression and/or roll.

Figure 7C:
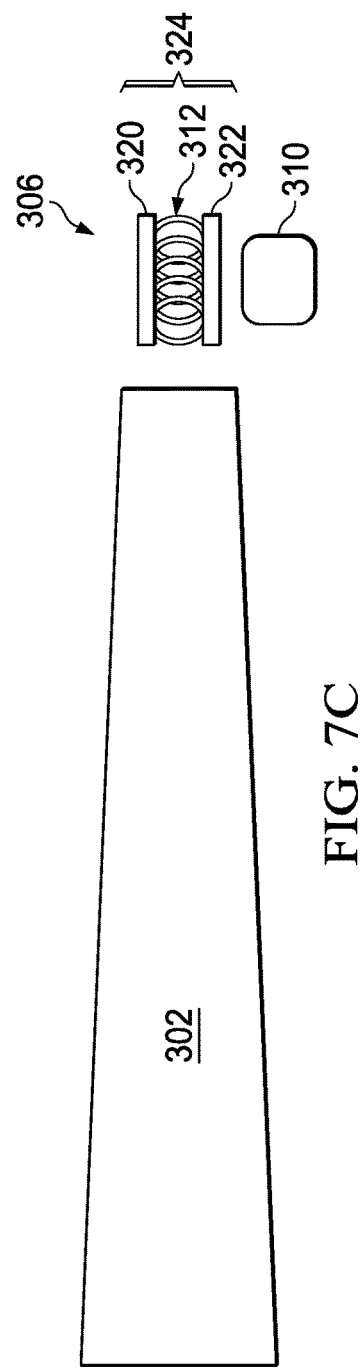
FIG. 7C shows a diagram of a side view of one configuration of the damper of the present invention.

FIG. 7C shows a diagram of a side view of another configuration of the damper assembly 306 of the present invention, which is attached to the tail boom 302, and in which the mass is the tail ballast. In this configuration, the wire rope 312 is connected to plate 320 and plate 322, one of which is attached to the mass 310, and the mass is positioned below the plate and wire assembly 324. In this configuration, the wire rope isolators dampen based on compression.

Figure 8A:
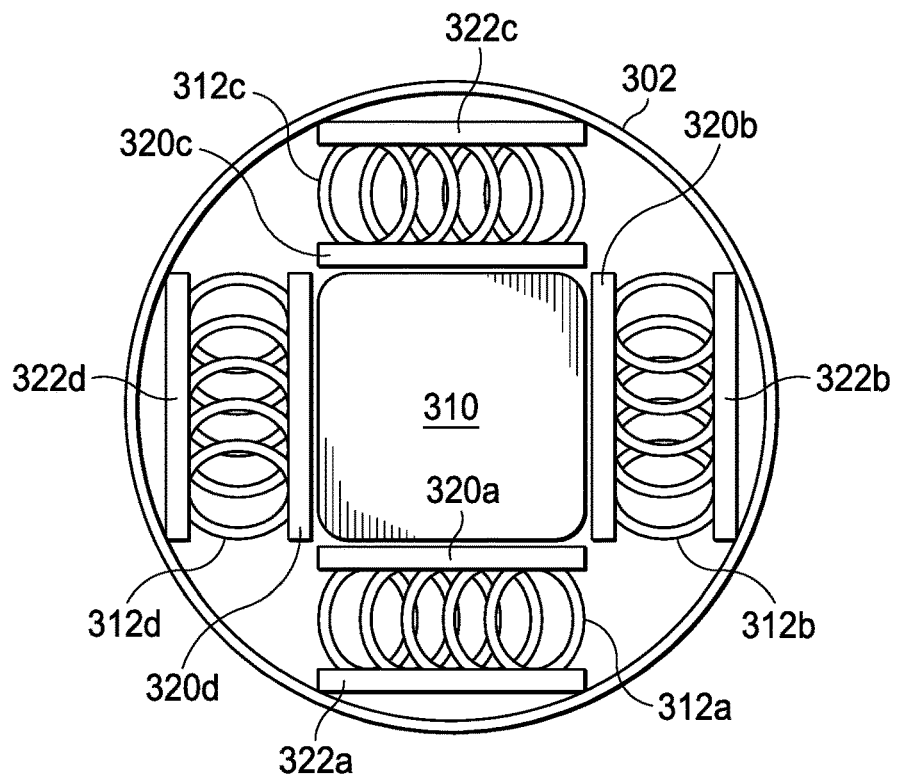
FIG. 8A shows a diagram of an end view of one configuration of the damper of the present invention.

FIG. 8A shows a diagram of an end view of one configuration of the damper assembly 306 within the tail boom 302. The mass 310 is depicted in the center of the tail boom 302, and the mass 310 is shown attached to the wire ropes 312a, 312b, 312c, and 312d via plates 320a, 320b, 320c, and 320d, and the wire ropes 312a, 312b, 312c, and 312d are attached to the tail boom via plates 322a, 322b, 322c, and 322d. In this configuration, the plates 320a-320d and 322a-322d are attached to the sides of wire ropes 312a-312d, which provide for isolation in different directions, e.g., along the longitudinal axis of the wire ropes 312a-312d, and based on the stiffness of the overall wire ropes 312a-312d, all of which can be optimized to maximize the dampening of vibrations by the mass 310. In this configuration, the longitudinal axis of the wire ropes 312a-312d are depicted as being generally perpendicular to the longitudinal axis of the tail boom 302, however, the skilled artisan will recognize that the longitudinal axis of the wire ropes 312a-312d can be varied in relation to the longitudinal axis of the tail boom 302 for each of wire ropes 312a-312d. In this configuration, the wire rope isolators can be a compact rope isolator that each provide dampening based on both compression and shear.

Figure 8B:
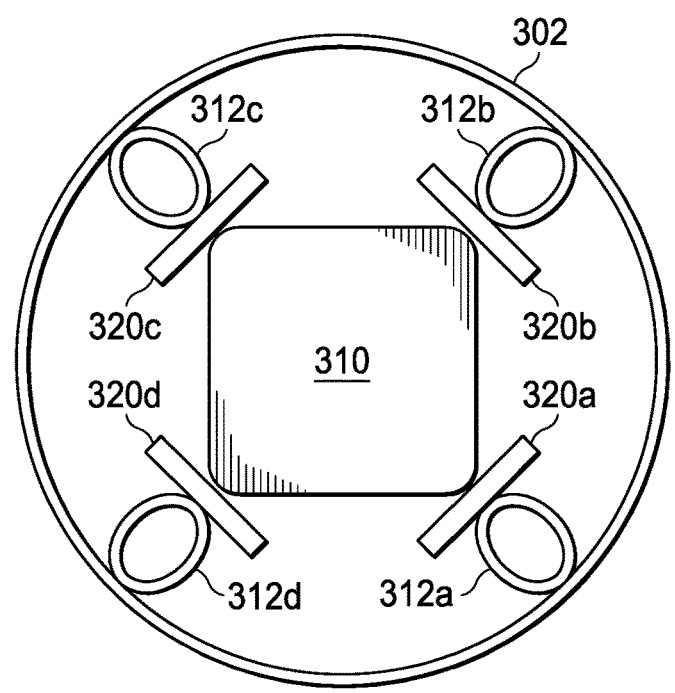
FIG. 8B shows a diagram of an end view of one configuration of the damper of the present invention.

FIG. 8B shows a diagram of an end view of one configuration of the damper assembly 306 within the tail boom 302. The mass 310 is depicted in the center of the tail boom 302, and the mass 310 is shown attached to the wire ropes 312a, 312b, 312c, and 312d via plates 320a, 320b, 320c, and 320d, and the wire ropes 312a, 312b, 312c, and 312d are attached to the tail boom. In this configuration, the plates 320a-320d are attached to the sides of wire ropes 312a-312d, which provide for isolation in different directions, e.g., along the longitudinal axis of the wire ropes 312a-312d, and based on the stiffness of the overall wire ropes 312a-312d, all of which can be optimized to maximize the dampening of vibrations by the mass 310. In this configuration, the longitudinal axis of the wire ropes 312a-312d are depicted as being generally parallel to the longitudinal axis of the tail boom 302, however, the skilled artisan will recognize that the longitudinal axis of the wire ropes 312a-312d can be varied in relation to the longitudinal axis of the tail boom 302 for each of wire ropes 312a-312d. In this configuration, the wire rope isolators can be a wire rope isolator that each provide dampening based on both compression and roll.

Figure 9A:
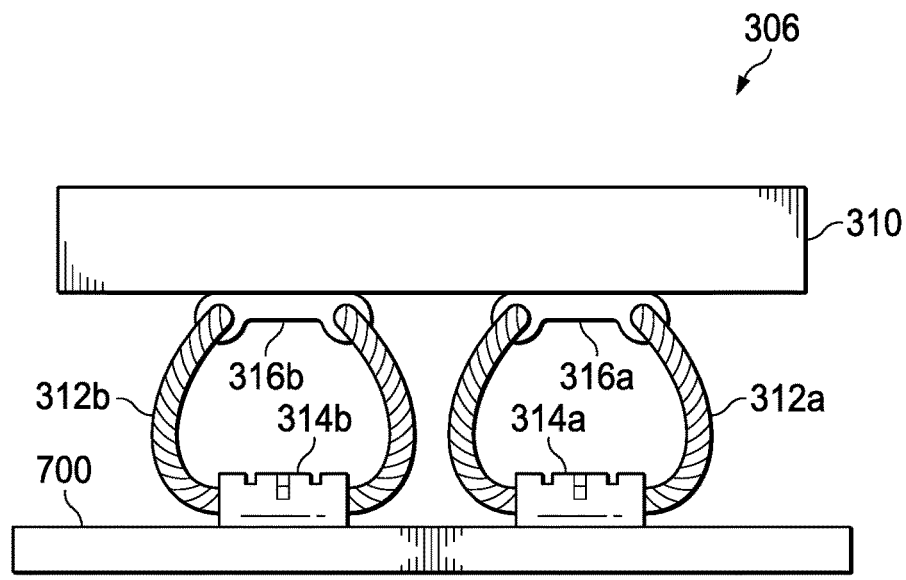
FIG. 9A shows a diagram of a side view of one configuration of the damper of the present invention.

FIG. 9A shows a diagram of a side view of one configuration of the damper assembly 306 of the present invention connected to an airframe 700. In this configuration, the damper assembly 306 includes the mass 310 (which can be, e.g., the tail ballast) that is connected via wire ropes 312a, 312b and first fasteners 314a, 314b. The wire ropes 312a, 312b are connected to the airframe 700 via second fasteners 316a, 316b. In this configuration, the mass 310 is cantilevered.

Figure 9B:
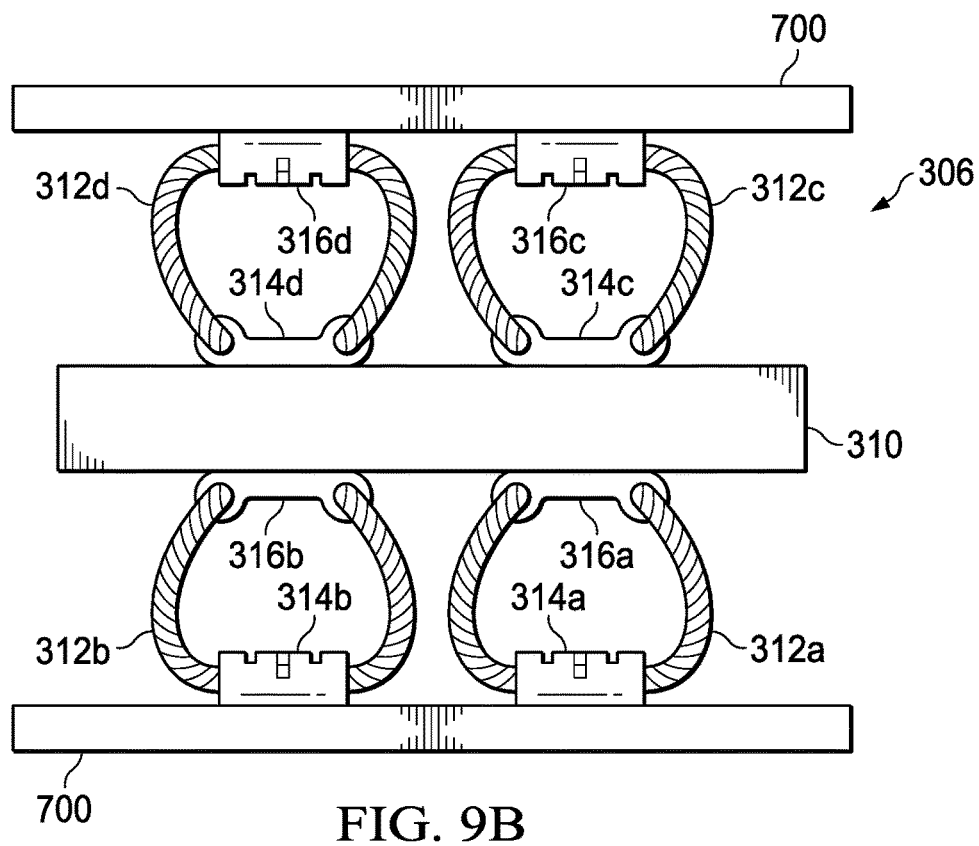
FIG. 9B shows a diagram of a side view of one configuration of the damper of the present invention.

FIG. 9B shows a diagram of a side view of one configuration of the damper assembly 306 of the present invention connected to an airframe 700. In this configuration, the damper assembly 306 includes the mass 310 (which can be, e.g., the tail ballast) that is located between pairs of wire ropes 312a, 312b and 312c, 312d and first fasteners 314a, 314b, 314c, 314d. The pairs of wire ropes 312a, 312b and 312c are connected to the airframe 700 via second fasteners 316a, 316b, 316c, 316d. In this configuration, the mass 310 is supported on both sides.

Figure 10A:
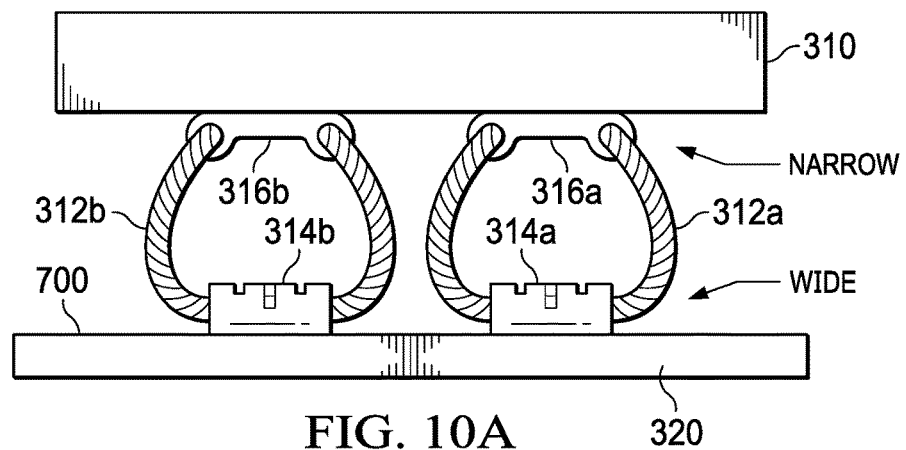
FIG. 10A shows a diagram of a side view of one configuration of the damper of the present invention.

FIG. 10A shows a diagram of a side view of another configuration of the damper assembly 306 of the present invention connected to an airframe 700 via plate 320. In this configuration, the damper assembly 306 includes the mass 310 (which can be, e.g., the tail ballast) that is connected via wire ropes 312a, 312b and first fasteners 314a, 314b to the plate 320. The plate 320 is attached to the airframe 700. The mass 310 is connected to the wire ropes 312a, 312b via second fasteners 316a, 316b along a narrow portion of the wire ropes 312a, 312b.

Figure 10B:
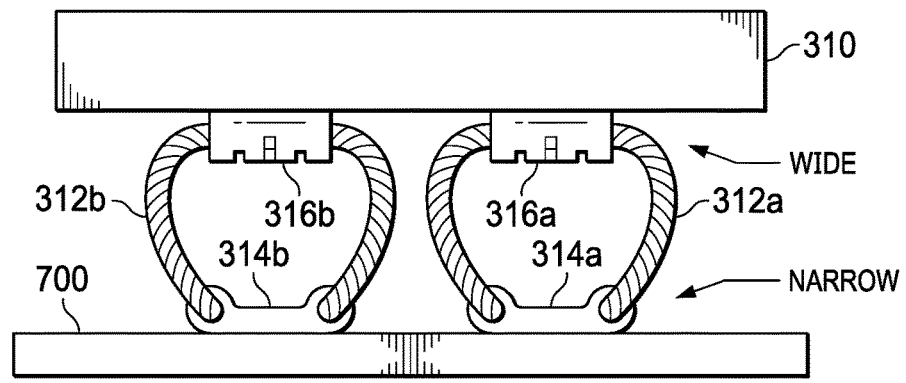
FIG. 10B shows a diagram of a side view of one configuration of the damper of the present invention.

FIG. 10B shows a diagram of a side view of configuration of the damper assembly 306 of the present invention connected to an airframe 700, but in which the wider portion of the wire ropes 312a, 312b is attached to the mass 310. In this configuration, the damper assembly 306 includes the mass 310 (which can be, e.g., the tail ballast) that is located between pairs of wire ropes 312a, 312b and 312c, 312d and first fasteners 314a, 314b, 314c, 314d. The pairs of wire ropes 312a, 312b and 312c are connected to the airframe 700 via second fasteners 316a, 316b, 316c, 316d.

Figure 11:
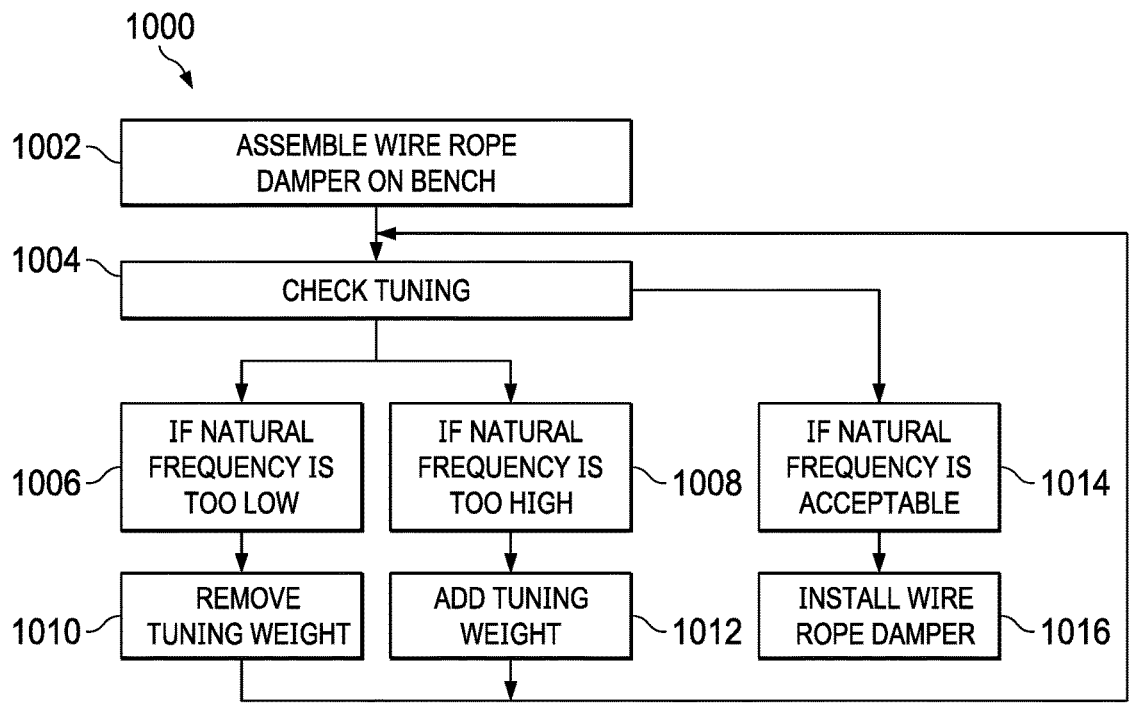
FIG. 11 is a flowchart for the selection of the wire rope isolator and/or mass for use as a dampener for shear of the present invention.

FIG. 11 is a flowchart 1000 for the selection of the wire rope isolator and/or mass for use as a damper for shear of the present invention. In step 1002, the wire rope damper is assembled and may include one or more tuning weights, and in step 1004 is checked for tuning. The result of the tuning step 1004 is that the natural frequency is too low (step 1006), the natural frequency is too high (step 1008), or that the natural frequency is found to be acceptable (step 1014). If the natural frequency is too low in step 1006, then one or more tuning weights are removed at step 1010. If the natural frequency is too high in step 1008, then one or more tuning weights are added at step 1012. After either steps 1010 or 1012, the tuning is again checked at step 1004, until the natural frequency is found to be acceptable in step 1014, and then the wire rope damper is installed at step 1016. The skilled artisan will understand that this flowchart 1000 can also be followed if the damper has already been installed on a aircraft, however, certain advantages are found from tuning the damper prior to installation. The damper can also be retuned after installation, or can be removed, retuned, and reinstalled.

The present invention can use wire rope isolators, such as those taught in, e.g., U.S. Pat. Nos. 6,406,011, 5,549,285, and 6,290,217, owned by Enidine, Inc., relevant portions and figures incorporated herein by reference.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein.

Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A passive damper assembly for an airframe comprising:
   a mass to damp a vibration of the airframe;
   one or more wire rope isolators having a first and a second portion, wherein the mass is attached to the one or more wire rope isolators and the mass is isolated from the airframe by the one or more wire rope isolators, wherein a shear stiffness and a cross-sectional geometrical shape of each of the one or more wire rope isolators are selected to provide frequency isolation of the mass in two or more known excitation frequencies; and
   a first fastener and a second fastener, wherein the first fastener attaches to the first portion of the wire rope isolator to the mass, and the second fastener attaches the second portion of the wire rope isolator to the airframe;
   wherein the damper assembly is connectable to the airframe such that it is configured to provide isolation based on shear only or based on compression only.

2. The damper assembly of claim 1, wherein a stiffness, a compression/shear, a compression/roll, and the cross-sectional geometrical shape of each of the one or more wire rope isolators are selected to provide frequency isolation of the mass in the two or more known excitation frequencies.

3. The damper assembly of claim 1, wherein the first fastener or the second fastener is selected to attach the damper assembly to a rotorcraft or vertical take-off and landing craft.

4. The damper assembly of claim 1, wherein the first and second portions of the one or more wire rope isolators are along a side of the one or more wire rope isolators.

5. The damper assembly of claim 1, wherein the mass is connected by 2, 3, 4, 5, 6, 7, 8, 9, 10, 11, 12, or more wire rope isolators that are positioned on one or more sides of the mass.

6. The damper assembly of claim 1, wherein the mass is positioned within an airframe, at an end of the airframe, at an end of a tail of the airframe, along a length of the tail boom, or a combination thereof.

7. The damper assembly of claim 1, wherein the one or more rope isolators comprise a ceramic.

8. The damper assembly of claim 1, further comprising a coating on the mass.

9. The damper assembly of claim 1, wherein the mass or the first or second fasteners are a metal, a composite, a polymer, a ceramic, an alloy, or a combination thereof.

10. The damper assembly of claim 1, wherein the one or more wire rope isolators comprise fiber strands, fiber wires, polymer strands, polymer wires, lubricating oil, a polymer, an adhesive, a filler, a coating, a composite, or a combination thereof.

11. The damper assembly of claim 1, wherein a wire rope of the one or more wire rope isolators is selected from a size, a cross-sectional geometrical shape, and a strength of the wire rope in one or more dimensions based on at least one of: (1) a rope bending length l; (2) a diameter D of sheave or drum; (3) one or more simple bendings per working cycle w-sim; (4) one or more reverse bendings per working cycle w-rev; (5) a combined fluctuating tension and bending per working cycle w-com; (6) a relative fluctuating tensile force deltaS/S; or (7) a rope tensile force S.

12. The damper assembly of claim 1, wherein the vibration is adjusted in two or more frequencies based on the shape, a size, a compressive strength, a rotational strength, or a pull strength of the one or more wire rope isolators.

13. The damper assembly of claim 1, further comprising one or more tuning weights attached to the mass, the one or more wire rope isolators, or both.

14. A method for passively damping vibration of an airframe comprising:
   providing a mass to dampen the vibration of the airframe;
   selecting one or more wire rope isolators having a first and a second portion, wherein the mass is isolated from the airframe by the one or more wire rope isolators, and wherein a shear stiffness and a cross-sectional geometrical shape of each of the one or more wire rope isolators are selected to provide frequency isolation of the mass in two or more known excitation frequencies; and attaching the mass to the one or more wire rope isolators and the one or more wire rope isolators to the airframe, wherein one or more first fasteners attach the first portion of the one or more wire rope isolators to the mass, and one or more second fasteners attach the second portion of the one or more wire rope isolators to the airframe, such that the mass and the one or more wire rope isolators are configured to dampen vibration based on shear only or based on compression only.

15. The method of claim 14, wherein a stiffness, a compression/shear, a compression/roll, and the cross-sectional geometrical shape of each of the one or more wire rope isolators are selected to provide frequency isolation of the mass in the two or more known excitation frequencies.

16. The method of claim 14, wherein the first fastener or the second fastener is selected to attach the damper assembly to a rotorcraft or vertical take-off and landing craft.

17. The method of claim 14, wherein the first and second portions of the one or more wire rope isolators are at an end of the one or more wire rope isolators.

18. The method of claim 14, wherein the mass is connected by 2, 3, 4, 5, 6, 7, 8, 9, 10, 11, 12, or more wire rope isolators that are positioned on one or more sides of the mass.

19. The method of claim 14, wherein the mass is positioned within an airframe, at an end of the airframe, at an end of a tail boom of the airframe, along a length of the tail boom, or a combination thereof.

20. The method of claim 14, further comprising attaching one or more tuning weights to the mass, the one or more wire rope isolators, or both.

21. The method of claim 14, further comprising a coating on the one or more wire rope isolators.

22. The method of claim 14, wherein the mass or the first or second fasteners are a metal, a composite, a polymer, a ceramic, an alloy, or a combination thereof.

23. The method of claim 14, wherein the one or more wire rope isolators comprise fiber strands, fiber wires, polymer strands, polymer wires, lubricating oil, a polymer, an adhesive, a filler, a coating, a composite, or a combination thereof.

24. The method of claim 14, wherein a wire rope of the wire rope isolators is selected from a size, a cross-sectional geometrical shape, and a strength of the wire rope in one or more dimensions based on at least one of: (1) a rope bending length 1; (2) a diameter D of sheave or drum; (3) one or more simple bendings per working cycle w-sim; (4) one or more reverse bendings per working cycle w-rev; (5) a combined fluctuating tension and bending per working cycle w-com; (6) a relative fluctuating tensile force deltaS/S; or (7) a rope tensile force S.

25. The method of claim 14, wherein the vibration is adjusted in two or more frequencies based on the cross-sectional geometrical shape, a size, a compressive strength, a rotational strength, or a pull strength of the one or more wire rope isolators.

26. A passive mass damper kit for an airframe comprising:
a mass selected to dampen a vibration of the airframe;
one or more wire rope isolators, each having a first and a second portion, wherein a shear stiffness and a cross-sectional geometrical shape of each of the one or more wire rope isolators are selected to provide frequency isolation of the mass in two or more known excitation frequencies, wherein the one or more wire rope isolators are selected to dampen airframe vibration; and
one or more first fasteners and one or more second fasteners, wherein the one or more first fasteners are adapted to attach the first portion of the wire rope isolator to the mass, and the one or more second fasteners are adapted to attach the second portion of the wire rope isolator to the airframe to dampen vibration of the airframe;
wherein the mass and the one or more wire rope isolators are connectable to the airframe such that it is configured to provide isolation based on shear only or based on compression only; and
instructions to attach the mass to the one or more wire rope isolators via the one or more first fasteners and to attach the one or more wire rope isolators to the airframe via the one or more second fasteners.

27. The passive mass damper kit of claim 26, wherein a stiffness, a compression/shear, a compression/roll, and the cross-sectional geometrical shape of each of the one or more wire rope isolators are selected to provide frequency isolation of the mass in the two or more known excitation frequencies.

28. The passive mass damper kit of claim 26, wherein a wire rope of the one or more wire rope isolators is selected from a size, a cross-sectional geometrical shape, and a strength of the wire rope in one or more dimensions based on at least one of: (1) a rope bending length 1; (2) a diameter D of sheave or drum; (3) one or more simple bendings per working cycle w-sim; (4) one or more reverse bendings per working cycle w-rev, (5) a combined fluctuating tension and bending per working cycle w-com, (6) a relative fluctuating tensile force deltaS/S, or (7) a rope tensile force S.

29. The passive mass damper kit of claim 26, wherein the vibration is adjusted in two or more frequencies based on the shape, a size, a compressive strength, a rotational strength, or a pull strength of the one or more wire rope isolators.

* * * * *